United States Patent
Sato et al.

(10) Patent No.: US 8,329,612 B2
(45) Date of Patent: Dec. 11, 2012

(54) CATALYST FOR REFORMING HYDROCARBON GAS, METHOD OF MANUFACTURING THE SAME, AND METHOD OF MANUFACTURING SYNTHESIZED GAS

(75) Inventors: Hideto Sato, Nagaokakyo (JP); Yoshinori Saito, Nagaokakyo (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 0 days.

(21) Appl. No.: 13/311,646

(22) Filed: Dec. 6, 2011

(65) Prior Publication Data

US 2012/0074357 A1    Mar. 29, 2012

Related U.S. Application Data

(63) Continuation of application No. PCT/JP2010/059817, filed on Jun. 10, 2010.

(30) Foreign Application Priority Data

Jun. 12, 2009 (JP) ................................. 2009-141085
Aug. 21, 2009 (JP) ................................. 2009-191712

(51) Int. Cl.
*B01J 23/00* (2006.01)
*C01F 11/02* (2006.01)
*C01G 23/00* (2006.01)

(52) U.S. Cl. ........ 502/328; 502/337; 502/340; 502/350; 423/594.16; 423/598

(58) Field of Classification Search ................... 502/328, 502/337, 340, 350; 423/647, 653, 654, 656, 423/594.16, 598; 518/715
See application file for complete search history.

(56) References Cited

U.S. PATENT DOCUMENTS

| 4,948,769 A | * | 8/1990 | Chapple | 502/68 |
| 6,130,182 A | * | 10/2000 | Naeem | 502/328 |
| 2004/0018409 A1 | * | 1/2004 | Hui et al. | 429/33 |
| 2009/0269264 A1 | | 10/2009 | Saito et al. | |
| 2010/0015014 A1 | * | 1/2010 | Gopalan et al. | 422/187 |

FOREIGN PATENT DOCUMENTS

| JP | 08231204 A | 9/1996 |
| JP | 9-168740 A | 6/1997 |
| JP | 10194703 A | 7/1998 |
| JP | 2002-059006 A | 2/2002 |
| JP | 2004089812 A | 3/2004 |
| JP | 2006346598 A | 12/2006 |
| WO | WO-2008/084785 A1 | 7/2008 |

OTHER PUBLICATIONS

Shiozaki et al., "Sustainable Ni/BaTiO3 Catalysts for Partial Oxidation of Methane to Synthesis Gas", Surface Science and Catalysis, vol. 110, 1997, pp. 701-710.*
Written Opinion of the International Searching Authority, mailed Sep. 7, 2010.

* cited by examiner

*Primary Examiner* — Cam N. Nguyen
(74) *Attorney, Agent, or Firm* — Dickstein Shapiro LLP

(57) ABSTRACT

A catalyst for reforming a hydrocarbon gas using carbon dioxide and/or water vapor to react while restraining the deposition of carbon contains a NiO—$Sr_2TiO_4$ solid solution in which NiO is dissolved in $Sr_2TiO_4$. The ratio of NiO in the NiO—$Sr_2TiO_4$ solid solution is preferably of 2.2 to 13.5 parts by mol relative to 100 parts by mol of $Sr_2TiO_4$. A catalyst which can contain $SrTiO_3$, $SrCO_3$, and fine grains of Ni and/or NiO are also described. A method of manufacturing the same, and a method of manufacturing a synthesized gas.

6 Claims, 4 Drawing Sheets

FIGURE 2(a)
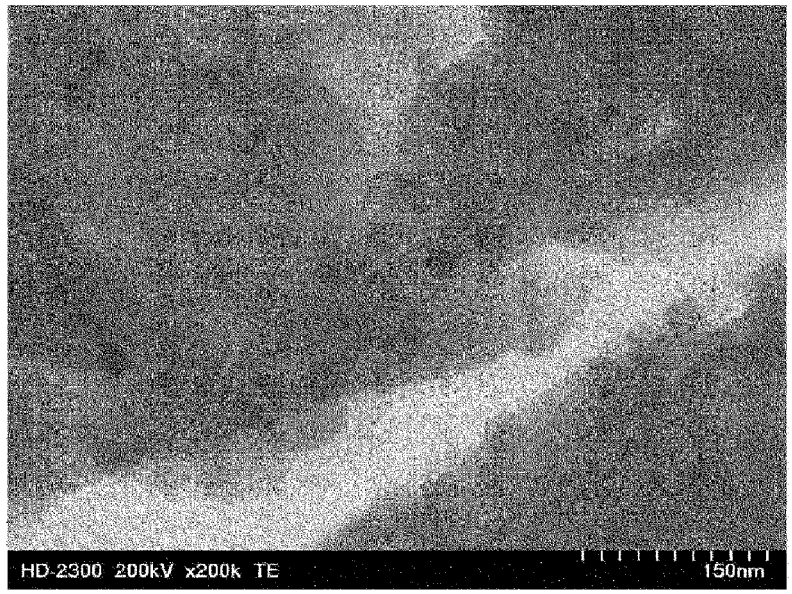
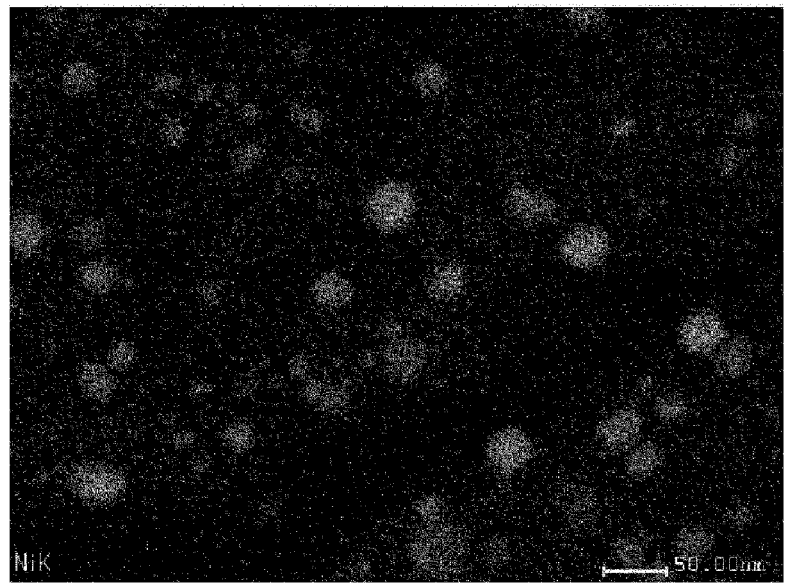
FIGURE 2(b)

FIGURE 3(a)
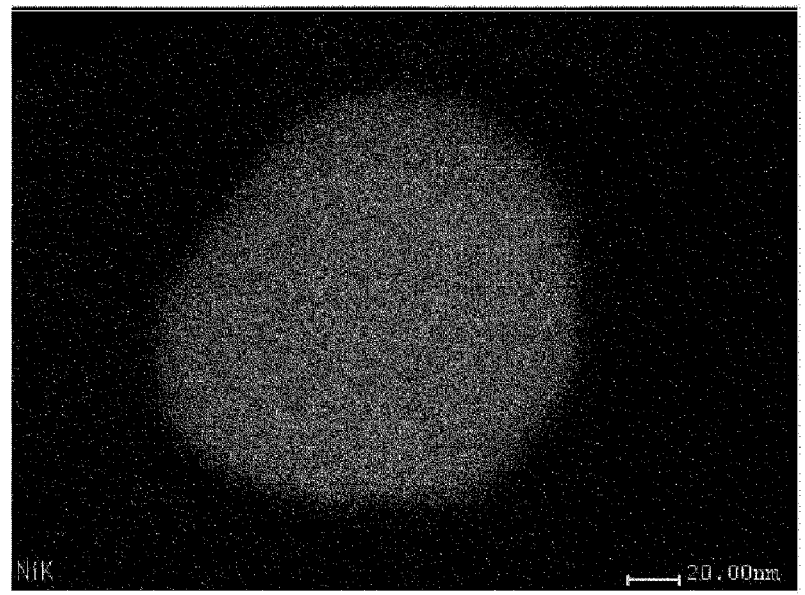
FIGURE 3(b)

FIGURE 4(a)
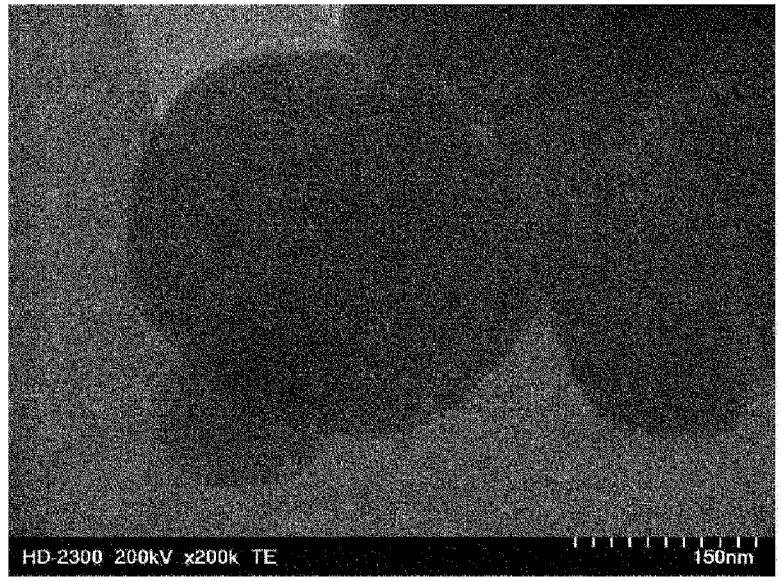
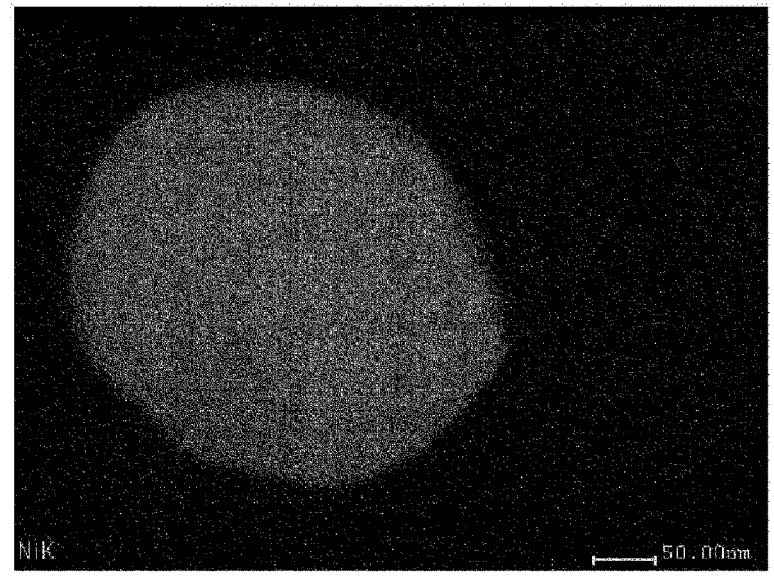
FIGURE 4(b)

CATALYST FOR REFORMING HYDROCARBON GAS, METHOD OF MANUFACTURING THE SAME, AND METHOD OF MANUFACTURING SYNTHESIZED GAS

TECHNICAL FIELD

The present invention relates to a catalyst for reforming a hydrocarbon gas used in manufacturing a synthesized gas containing hydrogen and carbon monoxide by reforming a hydrocarbon source material gas, a method of manufacturing the same, and a method of manufacturing a synthesized gas using the catalyst for reforming a hydrocarbon gas.

BACKGROUND ART

Various hydrocarbon gases are generated in the arts of petroleum refining or petrochemistry. However, these gases are not necessarily utilized efficiently as source material gases for various substances, so that a method of conversion into more effective substances has been demanded.

For manufacturing a synthesized gas containing hydrogen and carbon monoxide by reforming a hydrocarbon gas, there are known methods such as reforming a hydrocarbon with carbon dioxide, reforming a hydrocarbon with water vapor, and reforming saturated hydrocarbon by using the carbon dioxide and water vapor in combination in which both of carbon dioxide and water vapor are allowed to react in the presence of a catalyst.

Reforming a hydrocarbon with carbon dioxide is suitable for manufacturing a synthesized gas having a comparatively high carbon monoxide concentration by allowing a saturated hydrocarbon such as methane and carbon dioxide to react in the presence of a catalyst.

On the other hand, reforming a hydrocarbon with water vapor is suitable for manufacturing a synthesized gas having a comparatively high hydrogen concentration by allowing a saturated hydrocarbon such as methane and water vapor to react in the presence of a catalyst.

Also, the method of reforming a saturated hydrocarbon such as methane by using carbon dioxide and water vapor in combination in which both of carbon dioxide and water vapor are allowed to react in the presence of a catalyst has an advantage in that the ratio of hydrogen and carbon monoxide in the synthesized gas to be manufactured can be adjusted by adjusting the ratio of carbon dioxide and water vapor.

By such reforming of a hydrocarbon gas, carbon may be deposited on the catalyst during the process of decomposition of the hydrocarbon. The degree of this carbon deposition varies depending on a hydrocarbon reforming conditions. It is reported that carbon is most liable to be deposited in the reforming of a hydrocarbon with carbon dioxide, and that the amount of carbon deposition is comparatively small in the reforming of a hydrocarbon with water vapor. However, the carbon deposited on the catalyst gradually accumulates to lower the catalyst activity. When carbon is deposited in a large amount, there is a fear of clogging the reaction tube. Therefore, even in the reforming of a hydrocarbon with water vapor, carbon deposition is restrained generally by setting the ratio of water vapor to hydrocarbon (hereafter "water vapor/hydrocarbon ratio") to be high in order to introduce water vapor in an excessive amount.

As a catalyst for reforming a hydrocarbon with carbon dioxide or water vapor, there are known a nickel catalyst in which nickel is carried on a base such as alumina, and a supported ruthenium catalyst (See Patent Document 1), and further a rhodium catalyst in which rhodium is carried on a base such as alumina (See Patent Document 2), and the like.

Also, as a catalyst for reforming hydrocarbon with carbon dioxide, a catalyst containing a carbonate of at least one kind of alkaline earth metal selected from Ca, Sr, and Ba, a catalyst metal selected from Ni, Rh, Ru, Ir, Pd, Pt, Re, Co, Fe, Mo, and the like, and $ATiO_3$ (A is at least one kind of alkaline earth metal selected from the group consisting of Ca, Sr, and Ba) is proposed (See Patent Document 3).

A typical nickel catalyst for reforming a hydrocarbon with water vapor in which nickel is carried on a base such as alumina is liable to cause carbon deposition on the catalyst. Therefore, there is the need to perform a reaction of reforming hydrocarbon with water vapor under a condition of a high water vapor/hydrocarbon ratio in which water vapor is excessive relative to the hydrocarbon in order to restrain the lowering of activity by carbon deposition. In order to make the water vapor excessive, however, there is a problem in that the energy consumption increases in the process of vaporizing water. Also, there is a problem in that it is not suitable for a use which needs a synthesized gas having a high carbon monoxide concentration, such as fuel synthesis, because the carbon monoxide concentration in the composition of the synthesized gas to be manufactured decreases. Further, there is a problem in that a stable and efficient operation of the apparatus is difficult with the above nickel catalyst in the case of attempting to reform a hydrocarbon with carbon dioxide or to reform a hydrocarbon by using carbon dioxide and water vapor in combination because it is a reforming reaction that is more liable to generate the carbon deposition.

A ruthenium catalyst as shown in Patent Document 1 has a function of restraining carbon deposition, so that the carbon deposition is less in amount compared to a nickel catalyst, and also maintenance of the activity is easy. However, there is a problem in that when an unsaturated hydrocarbon such as ethylene coexists in a source material, thermal carbon deposition and a decrease in the activity are liable to occur, so that, even if the ruthenium catalyst produces an effect of restraining the carbon deposition, the catalyst is poisoned by unsaturated hydrocarbon or the like contained in the source material gas, leading to a decrease in the activity.

It is assumed that a rhodium catalyst in which rhodium is carried on a base such as alumina, as shown in Patent Document 2, also raises a similar problem.

Even in a case where the catalyst for reforming with carbon dioxide of Patent Document 3 is used, carbon deposition onto the catalyst is liable to be generated when reforming under a high-pressure condition, thereby raising a problem of decrease in the reforming efficiency.

PATENT DOCUMENTS

Patent Document 1: Japanese Patent Application laid-open (JP-A) No. 08-231204
Patent Document 2: Japanese Patent Application laid-open (JP-A) No. 09-168740
Patent Document 3: International Publication No. 2008/084785 Pamphlet

SUMMARY OF THE INVENTION

Problems to be Solved by the Invention

The present invention solves the aforementioned problems, and an object thereof is to provide a catalyst for reforming a hydrocarbon gas capable of efficiently producing hydrogen and carbon monoxide by allowing a hydrocarbon source material gas and carbon dioxide and/or water vapor to react while restraining the deposition of carbon, a method of manufacturing the same, and a method of manufacturing a synthesized gas using the catalyst for reforming a hydrocarbon gas and being capable of efficiently producing hydrogen and carbon monoxide.

Means for Solving the Problems

In order to solve the aforementioned problems, the catalyst for reforming a hydrocarbon gas of the present invention is a hydrocarbon gas reforming catalyst used for producing a synthesized gas containing carbon monoxide and hydrogen by reforming a hydrocarbon gas with use of carbon dioxide and/or water vapor, and has a feature of including a NiO—$Sr_2TiO_4$ solid solution in which NiO is dissolved in $Sr_2TiO_4$.

In the above hydrocarbon gas reforming catalyst, the ratio of NiO in the NiO—$Sr_2TiO_4$ solid solution is preferably a ratio of 2.2 to 13.5 parts by mol relative to 100 parts by mol of $Sr_2TiO_4$.

Also, the hydrocarbon gas reforming catalyst of the present invention is used for producing a synthesized gas containing carbon monoxide and hydrogen by reforming a hydrocarbon gas with use of carbon dioxide and/or water vapor, and has a feature of including $SrTiO_3$, $SrCO_3$, and Ni and/or NiO which are produced by allowing carbon dioxide to act on the NiO—$Sr_2TiO_4$ solid solution.

The method of manufacturing a hydrocarbon gas reforming catalyst of the present invention, used for producing a synthesized gas containing carbon monoxide and hydrogen by reforming a hydrocarbon source material gas with use of carbon dioxide and/or water vapor and containing a NiO—$Sr_2TiO_4$ solid solution in which NiO is dissolved in $Sr_2TiO_4$ as a major component, has a feature of including a step of:

producing the NiO—$Sr_2TiO_4$ solid solution in which NiO is dissolved in $Sr_2TiO_4$ by thermally treating a mixture containing $SrTiO_3$, $SrCO_3$, and Ni and/or NiO at a temperature of 900° C. or higher.

Further, the method of manufacturing a hydrocarbon gas reforming catalyst of the present invention used for producing a synthesized gas containing carbon monoxide and hydrogen by reforming a hydrocarbon source material gas with use of carbon dioxide and/or water vapor and containing a NiO—$Sr_2TiO_4$ solid solution in which NiO is dissolved in $Sr_2TiO_4$ as a major component, has a feature of including a step of:

producing the NiO—$Sr_2TiO_4$ solid solution in which NiO is dissolved in $Sr_2TiO_4$ by thermally treating a mixture containing $TiO_2$, $SrCO_3$, and Ni and/or NiO at a temperature of 900° C. or higher.

Further, the method of manufacturing a hydrocarbon gas reforming catalyst of the present invention for producing a synthesized gas containing carbon monoxide and hydrogen by reforming a hydrocarbon source material gas with use of carbon dioxide and/or water vapor and containing $SrTiO_3$, $SrCO_3$, and Ni and/or NiO as major components, has a feature of including steps of:

producing a NiO—$Sr_2TiO_4$ solid solution in which NiO is dissolved in $Sr_2TiO_4$ by thermally treating a mixture containing $SrTiO_3$, $SrCO_3$, and Ni and/or NiO at a temperature of 900° C. or higher; and producing $SrTiO_3$, $SrCO_3$, and Ni and/or NiO by allowing carbon dioxide to act on the NiO—$Sr_2TiO_4$ solid solution.

The method of manufacturing a hydrocarbon gas reforming catalyst of the present invention for producing a synthesized gas containing carbon monoxide and hydrogen by reforming a hydrocarbon source material gas with use of carbon dioxide and/or water vapor and containing $SrTiO_3$, $SrCO_3$, and Ni and/or NiO as major components, has a feature of including steps of:

producing a NiO—$Sr_2TiO_4$ solid solution in which NiO is dissolved in $Sr_2TiO_4$ by thermally treating a mixture containing $TiO_2$, $SrCO_3$, and Ni and/or NiO at a temperature of 900° C. or higher; and producing $SrTiO_3$, $SrCO_3$, and Ni and/or NiO by allowing carbon dioxide to act on the NiO—$Sr_2TiO_4$ solid solution.

The method of manufacturing a synthesized gas of the present invention has a feature of including steps of:

producing a NiO—$Sr_2TiO_4$ solid solution in which NiO is dissolved in $Sr_2TiO_4$;

producing $SrTiO_3$, $SrCO_3$, and Ni and/or NiO by allowing carbon dioxide to act on the NiO—$Sr_2TiO_4$ solid solution; and producing the synthesized gas containing carbon monoxide and hydrogen by allowing a gas containing a hydrocarbon source material gas and carbon dioxide and/or water vapor to flow through a reformer filled with the catalyst containing $SrTiO_3$, $SrCO_3$, and Ni and/or NiO as major components, so as to bring the gas into contact with the reforming catalyst.

EFFECTS OF THE INVENTION

The hydrocarbon gas reforming catalyst (hereafter simply also referred to as a reforming catalyst) of the present invention is a catalyst containing a NiO—$Sr_2TiO_4$ solid solution in which NiO is dissolved in $Sr_2TiO_4$, and the Ni and/or NiO deposited by allowing carbon dioxide to act on the catalyst will be fine grains. As a result, it is possible to obtain a reforming catalyst capable of restraining carbon deposition even when a reforming reaction is carried out by allowing a hydrocarbon source material gas and carbon dioxide and/or water vapor to react under high pressure.

The amount of conversion to a synthesized product will rise in chemical synthesis carried out at higher pressure. Therefore, it is assumed that the synthesized gas used as a source material preferably has high pressure. The reforming catalyst according to the present invention in which fine Ni and/or NiO is deposited can be used without incurring carbon deposition even under high pressure, as described above. Therefore, it is particularly significant when this reforming catalyst is used by being incorporated into a part of a chemical synthesis process that carries out a reaction under high pressure. In other words, by using the reforming catalyst according to the present invention, there will be no need to re-pressurize a synthesized gas obtained under low pressure.

Also, there is an advantage in that the reaction apparatus in the reforming reaction will be compact since a reaction under high pressure is enabled.

The reforming catalyst according to the present invention in which fine Ni and/or NiO is deposited can be used under a pressure of 5 atm or higher in terms of absolute pressure.

The reforming catalyst according to the present invention works as a catalyst when the reaction involves allowing methane, which is hydrocarbon, and carbon dioxide to flow at a high temperature of 800° C. to 1100° C., for example, as follows.

$$CH_4 \Rightarrow C + 2H_2 \quad (1)$$

$$C + CO_2 \Rightarrow 2CO \quad (2)$$

$$CH_4 + CO_2 \Rightarrow 2H_2 + 2CO \quad (3)$$

In the reaction of reforming methane ($CH_4$) with carbon dioxide, the decomposition reaction of $CH_4$ in the formula (1) and the reaction of producing CO in the formula (2) proceed and, as a result, the reforming reaction with carbon dioxide is represented by the formula (3).

With a conventional catalyst in which an oxide such as alumina or silica is used as a carrier, the reaction speed of (2) is slower than (1), so that the decomposition of $CH_4$ in the formula (1) may proceed to generate carbon deposition, or the reaction of the formula (2) may proceed to generate carbon deposition.

In contrast, the reforming catalyst of the present invention particularly produces an effect of promoting the reaction (2). The presence of fine Ni and/or NiO allows the carbon generated by reaction (1) to be removed by reaction (2) and, as a result, carbon deposition can be restrained.

The reforming catalyst according to the present invention also works effectively as a catalyst in the case of the reaction of methane, as a hydrocarbon example, and water vapor at a high temperature, which is represented by the following formula (4).

$$CH_4 + H_2O \rightleftharpoons 3H_2 + CO \qquad (4)$$

The reforming catalyst according to the present invention works effectively in the case of obtaining a synthesized gas in which the ratio of $H_2$ and CO is, for example, $H_2/CO=3$ to 1 by volume, by simultaneously carrying out the carbon dioxide reforming reaction in which the hydrocarbon (e.g., methane), and carbon dioxide are allowed to react as in the above reactions (1) to (3) and the water vapor reforming reaction in which the hydrocarbon, and water vapor are allowed to react as in the above reaction (4).

By setting the ratio of NiO in the NiO—$Sr_2TiO_4$ solid solution to be within a range of 2.2 parts by mol to 13.5 parts by mol relative to 100 parts by mol of $Sr_2TiO_4$ in the present invention, all of the NiO can be dissolved in $Sr_2TiO_4$, whereby it is possible to obtain a reforming catalyst capable of restraining and preventing the carbon deposition with a greater certainty when fine Ni and/or NiO is deposited by allowing carbon dioxide to act on the NiO—$Sr_2TiO_4$ solid solution used in reforming with carbon dioxide, reforming with water vapor, or combination reforming with use of both of carbon dioxide and water vapor, making the present invention further more effective.

By thermally treating a mixture containing $SrTiO_3$, $SrCO_3$, and Ni and/or NiO at a temperature of 900° C. or higher in producing a NiO—$Sr_2TiO_4$ solid solution in which NiO is dissolved in $Sr_2TiO_4$ (Sr—Ti composite oxide), the NiO—$Sr_2TiO_4$ solid solution in which NiO is dissolved in $Sr_2TiO_4$ can be produced with certainty.

Also, by thermally treating a mixture containing $TiO_2$, $SrCO_3$, and Ni and/or NiO at a temperature of 900° C. or higher in producing a NiO—$Sr_2TiO_4$ solid solution in which NiO is dissolved in $Sr_2TiO_4$, the NiO—$Sr_2TiO_4$ solid solution in which NiO is dissolved in $Sr_2TiO_4$ can be produced with certainty.

According to the method of manufacturing a reforming catalyst of the present invention, a reforming catalyst containing a NiO—$Sr_2TiO_4$ solid solution as a major component can be produced efficiently and with certainty, and also a reforming catalyst containing $SrTiO_3$, $SrCO_3$, and Ni and/or NiO as major components can be produced efficiently and with certainty.

The thermal treatment temperature for producing the NiO—$Sr_2TiO_4$ solid solution is preferably set to be a temperature of 900° C. or higher. There is no particular restriction to the upper limit of the thermal treatment temperature. Typically, however, the thermal treatment temperature is preferably set to be 1300° C. or lower in consideration of the heat treatment furnace construction material and energy consumption in the thermal treatment step.

In the case of producing a reforming catalyst containing $SrTiO_3$, $SrCO_3$, and Ni and/or NiO via the NiO—$Sr_2TiO_4$ solid solution, NiO is temporarily dissolved in $Sr_2TiO_4$, so that the Ni and/or NiO that is deposited thereafter will be fine grains. As a result, it is possible to obtain a reforming catalyst capable of restraining carbon deposition even when a reforming reaction is carried out by allowing a hydrocarbon source material gas and carbon dioxide and/or water vapor to react under high pressure.

A synthesized gas containing hydrogen and carbon monoxide can be efficiently manufactured from a hydrocarbon source material gas while restraining carbon deposition when the catalyst of the invention is used in any of the reforming reactions in which reforming is carried out by allowing a hydrocarbon and carbon dioxide to react with each other, allowing a hydrocarbon and water vapor to react with each other, and reforming with use of both of carbon dioxide and water vapor.

BRIEF EXPLANATION OF DRAWINGS

FIG. 2(a) shows a TEM image of a reforming catalyst A manufactured in the example of the present invention, and FIG. 2(b) is a view showing an EDX mapping image related to Ni of the reforming catalyst A.

FIG. 3(a) shows a TEM image of a reforming catalyst D (comparative example) manufactured for comparison in the example of the present invention, and FIG. 3(b) is a view showing an EDX mapping image related to Ni of the reforming catalyst D.

FIG. 4(a) shows a TEM image of a reforming catalyst F (comparative example) manufactured for comparison in the example of the present invention, and FIG. 4(b) is a view showing an EDX mapping image related to Ni of the reforming catalyst F.

MODE FOR CARRYING OUT THE INVENTION

Figure 1:
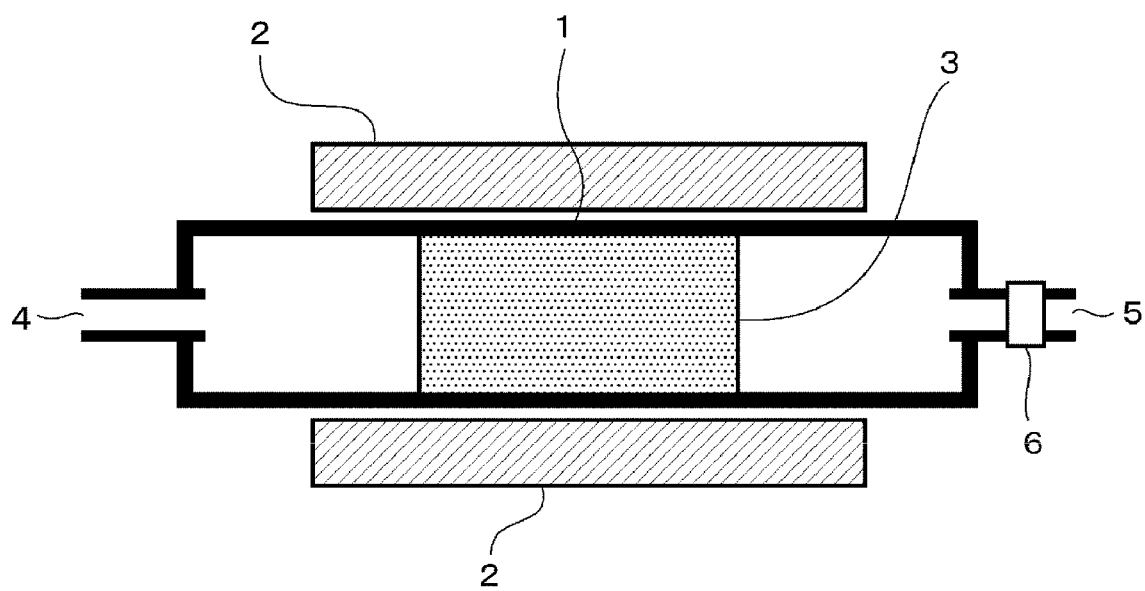
FIG. 1 is a view showing a schematic constitution of a testing apparatus used in carrying out a method of manufacturing a synthesized gas according to an example of the present invention.

Hereafter, the features of the present invention will be described in further detail with reference to examples of the present invention.

EXAMPLE 1

(1) Manufacture of a Reforming Catalyst A According to an Example of the Present Invention Strontium carbonate ($SrCO_3$) and titanium oxide ($TiO_2$) were weighed so as to attain a molar ratio of 2.0:1.0, and further, nickel oxide (NiO) was added and mixed so as to attain a ratio of 8.9 parts by mol relative to 100 parts by mol of the $Sr_2TiO_4$ to be produced. Subsequently, a binder was added to this mixture and granulated to obtain a spherical granulated body having a diameter of 2 to 5 mm.

Thereafter, the obtained granulated body was fired in air under a condition of 1100° C. for one hour to obtain a catalyst A.

The diffraction lines when performing an X-ray diffraction obtained measurement on the obtained catalyst A were only those of the $Sr_2TiO_4$ structure. Therefore, it was confirmed that the obtained catalyst A is a NiO—$Sr_2TiO_4$ solid solution in which an Ni component is dissolved in the crystal structure of $Sr_2TiO_4$, and that the amount of the dissolved Ni component is 8.9 parts by mol relative to 100 parts by mol of $Sr_2TiO_4$.

As will be shown later, this NiO—$Sr_2TiO_4$ solid solution will be a mixture of $SrTiO_3$, $SrCO_3$, and Ni and/or NiO after a reforming test. This mixture can be used as a catalyst as well.

(2) Manufacture of a Reforming Catalyst B According to an Example of the Present Invention Strontium carbonate ($SrCO_3$) and titanium oxide ($TiO_2$) were weighed so as to attain a molar ratio of 2.0:1.0, and further, nickel oxide (NiO) was added and mixed so as to attain a ratio of 13.5 parts by mol relative to 100 parts by mol of the $Sr_2TiO_4$ to be produced. Subsequently, a binder was added to this mixture and granulated so as to obtain a spherical granulated body having a diameter of 2 to 5 mm.

Thereafter, the obtained granulated body was fired in air under a condition of 1100° C. for one hour to obtain a catalyst B.

The diffraction lines obtained when performing an X-ray diffraction measurement on the obtained catalyst B were only the diffraction line of the $Sr_2TiO_4$ structure. Therefore, it was confirmed that the obtained catalyst B is a NiO—$Sr_2TiO_4$ solid solution in which an Ni component is dissolved in the crystal structure of $Sr_2TiO_4$, and that the amount of the dissolved Ni component is 13.5 parts by mol relative to $Sr_2TiO_4$.

Carbon dioxide acts on this NiO—$Sr_2TiO_4$ solid solution to produce $SrTiO_3$, $SrCO_3$, and Ni and/or NiO. This mixture can be used as a catalyst as well.

(3) Manufacture of a Reforming Catalyst C According to an Example of the Present Invention Strontium carbonate ($SrCO_3$) and titanium oxide ($TiO_2$) were weighed so as to attain a molar ratio of 2.0:1.0, and further, nickel oxide (NiO) was added and mixed so as to attain a ratio of 2.2 parts by mol relative to 100 parts by mol of the $Sr_2TiO_4$ to be produced. Subsequently, a binder was added to this mixture and granulated so as to obtain a spherical granulated body having a diameter of 2 to 5 mm.

Thereafter, the obtained granulated body was fired in air under a condition of 1100° C. for one hour to obtain a catalyst C.

As a result of performing an X-ray diffraction measurement on the obtained catalyst C, it was found that the obtained diffraction lines were only the diffraction line of the $Sr_2TiO_4$ structure. Therefore, it was confirmed that the obtained catalyst C is a NiO—$Sr_2TiO_4$ solid solution in which an Ni component is dissolved in the crystal structure of $Sr_2TiO_4$, and that the amount of the dissolved Ni component is 2.2 parts by mol relative to 100 parts by mol of $Sr_2TiO_4$.

A mixture of $SrTiO_3$, $SrCO_3$, and Ni and/or NiO obtained by allowing carbon dioxide to act on the NiO—$Sr_2TiO_4$ solid solution can be used as a catalyst as well.

(4) Manufacture of a Reforming Catalyst D for Comparison

Strontium carbonate ($SrCO_3$) and titanium oxide ($TiO_2$) were weighed so as to attain a molar ratio of 2.0:1.0, and further, nickel oxide (NiO) was added and mixed so as to attain a ratio of 22.2 parts by mol relative to 100 parts by mol of the $Sr_2TiO_4$ to be produced. Subsequently, a binder was added to this mixture and granulated, so as to obtain a spherical granulated body having a diameter of 2 to 5 mm.

Thereafter, the obtained granulated body was fired in air under a condition of 1100° C. for one hour to obtain a reforming catalyst D for comparison.

As a result of performing an X-ray diffraction measurement on the obtained catalyst D, the presence of a diffraction line of NiO phase was confirmed in addition to the diffraction line of the $Sr_2TiO_4$ structure. From this result, it was found out that a NiO phase exceeding the solid solution limit remains in catalyst D for comparison, in addition to the NiO—$Sr_2TiO_4$ solid solution.

(5) Manufacture of a Reforming Catalyst E for Comparison

Strontium carbonate ($SrCO_3$) and titanium oxide ($TiO_2$) were weighed so as to attain a molar ratio of 2.0:1.0, and further, nickel oxide (NiO) was added and mixed in the same amount as in the case of the catalyst A. Subsequently, a binder was added to this mixture and granulated, so as to obtain a spherical granulated body having a diameter of 2 to 5 mm.

Thereafter, the obtained granulated body was fired in air under a condition of 800° C. for one hour to obtain a reforming catalyst E for comparison.

An X-ray diffraction measurement was carried out on the obtained catalyst E. A diffraction line of the $Sr_2TiO_4$ structure was not confirmed, and it was confirmed that the obtained fired body is a mixed body of NiO phase, $SrCO_3$ phase, and $SrTiO_3$ phase. This is due to the fact that the firing temperature was low, and $Sr_2TiO_4$ phase was not produced.

(6) Manufacture of a Reforming Catalyst F for Comparison

Barium carbonate ($BaCO_3$) and titanium oxide ($TiO_2$) were weighed so as to attain a molar ratio of 2.0:1.0, and further, nickel oxide (NiO) was added and mixed so as to attain a ratio of 8.4 parts by mol relative to 100 parts by mol of the $Ba_2TiO_4$ to be produced. Subsequently, a binder was added to this mixture and granulated so as to obtain a spherical granulated body having a diameter of 2 to 5 mm.

Thereafter, the obtained granulated body was fired in air under a condition of 1100° C. for one hour to obtain a reforming catalyst F for comparison.

An X-ray diffraction measurement was carried out on the obtained catalyst F. As a result, it was confirmed that the obtained fired body has a mixed NiO phase and $Ba_2TiO_4$ phase, namely, that a solid solution of NiO phase and $Ba_2TiO_4$ phase is not formed.

(7) Manufacture of a Reforming Catalyst G for Comparison

Strontium carbonate ($SrCO_3$) and zirconium oxide ($ZrO_2$) were weighed so as to attain a molar ratio of 2.0:1.0, and further, nickel oxide (NiO) was added and mixed so as to attain a ratio of 8.9 parts by mol relative to 100 parts by mol of the $Sr_2ZrO_4$ to be produced. Subsequently, a binder was added to this mixture and granulated so as to obtain a spherical granulated body having a diameter of 2 to 5 mm.

The obtained granulated body was fired in air under a condition of 1100° C. for one hour to obtain a reforming catalyst G for comparison.

An X-ray diffraction measurement was carried out on the obtained catalyst G. It was confirmed that the obtained fired body has a mixed NiO phase and $Sr_2ZrO_4$ phase, namely, that a solid solution of NiO phase and $Sr_2ZrO_4$ phase is not formed.

The properties as a reforming catalyst reforming catalysts A to C of the present invention and the reforming catalysts D to G for comparison fabricated as described above, were examined and evaluated by the methods described below.

[2] Reforming Test Using Carbon Dioxide and Evaluation of Properties

As shown in FIG. 1, a reaction tube 1 made of metal and equipped with a heater 2 in the outside was loaded with 5 cc of a reforming catalyst 3, and a mixed gas of nitrogen and 20 vol % carbon dioxide was allowed to flow at a predetermined rate through an inlet 4 of the reaction tube 1. The mixed gas inlet temperature was controlled to be 800° C. by heater 2. After the temperature of the mixed gas was stabilized, a mixed gas of methane and carbon dioxide ($CH_4$: $CO_2$=1:1 by volume) was allowed to flow as a source material gas at a flow rate of 10 NL/h instead of the above mixed gas, so as to perform a reforming test for 8 hours.

During the reforming test, the pressure within the reaction tube 1 was adjusted to 9 atm in terms of absolute pressure by adjusting a back-pressure valve 6 disposed on an outlet 5 side of the reaction tube 1.

Also, the gas obtained through the outlet 5 during the test was introduced into an analyzing apparatus to measure gas concentration.

After the test was finished, the gas flow was stopped, cooling performed, and the reforming catalyst 3 was taken out from the reaction tube 1 to perform a thermal weight measurement under $CO_2$ flow. Here, the carbon deposited on the sample and $CO_2$ were allowed to react in the thermal weight measurement as in the following formula (2):

$$C+CO_2 \Rightarrow 2CO \qquad (2)$$

so as to estimate the decrease in the sample weight as a carbon deposition amount.

With respect to the reforming catalyst 3 after the test was finished, an X-ray diffraction measurement was carried out to identify the crystal phase.

Table 1 shows a methane conversion ratio by the following formula (3):

$$CH_4+CO_2 \Rightarrow 2H_2+2CO \qquad (3)$$

as the reforming reaction. The methane conversion ratio is a value showing how much of the introduced methane was converted into other substances (mainly carbon monoxide and hydrogen) by the reforming reaction, and the methane conversion ratio of Table 1 is a value showing a ratio of methane converted into other substances as a percentage relative to the introduced methane.

Further, Table 1 shows a carbon deposition amount and a crystal phase identified by the X-ray diffraction measurement with respect to the catalysts after the test.

TABLE 1

| Catalyst | Methane conversion ratio [%] | Deposited carbon [wt %] | Crystal phase after test |
|---|---|---|---|
| A | 58 | 0 | $SrCO_3$ $SrTiO_3$ Ni and/or NiO |
| B | 58 | 0 | $SrCO_3$ $SrTiO_3$ Ni and/or NiO |
| C | 42 | 0 | $SrCO_3$ $SrTiO_3$ Ni and/or NiO |
| D | 58 | 0.5 | $SrCO_3$ $SrTiO_3$ Ni and/or NiO |
| E | 57 | 2.8 | $SrCO_3$ $SrTiO_3$ Ni and/or NiO |
| F | 55 | >10 | $BaCO_3$ $BaTiO_3$ Ni and/or NiO |
| G | 57 | 0.6 | $SrCO_3$ $SrZrO_3$ Ni and/or NiO |

As shown in Table 1, the reforming catalysts A, B, and D to G showed a methane conversion ratio close to the equilibrium gas composition under a condition of 800° C. and 9 atm; however, catalysts D to G generated carbon deposition. Catalyst C did not generate carbon deposition although the catalyst C did not reach the equilibrium gas composition.

Based on the crystal phase after the test, it was understood that all of catalysts A to E which passed the test are constituted with $SrCO_3$, $SrTiO_3$, and Ni and/or NiO. However, the catalysts D and E in which free source material NiO remained generated carbon deposition while the catalysts A to C in which the total amount of the source material NiO was converted into a solid solution of NiO—$Sr_2TiO_4$ in the manufacturing process did not generate carbon deposition.

Similarly, free source material NiO remained in the cases of the catalyst F in which Sr in the catalyst A was replaced with Ba and the catalyst G in which Ti in the catalyst A was replaced with Zr, so that when these catalysts F and G were used, carbon deposition was generated.

TEM images of the reforming catalysts A, D, and F after the test are shown in FIG. 2(a), FIG. 3(a), and FIG. 4(a), respectively, and mapping images of Ni by the energy dispersion type X-ray spectroscopy (EDX) of the reforming catalysts A, D, and F are shown in FIG. 2(b), FIG. 3(b), and FIG. 4(b), respectively.

In the reforming catalyst A, the presence of Ni grains having a grain size of 50 nm or less can be confirmed as shown in FIGS. 2(a) and 2(b). In contrast, reforming catalyst F in which all source material NiO did not form a NiO—$Ba_2TiO_4$ solid solution in the manufacturing process is constituted with Ni grains having a grain size of 100 nm or more as shown in FIGS. 4(a) and 4(b), and is found to have a grain size equivalent to that of the grains of the source material NiO.

In reforming catalyst D in which the NiO exceeded the solid solution limit, large Ni grains having a grain size exceeding 100 nm remain as shown in FIGS. 3(a) and 3(b) because a part of NiO remains without being dissolved.

In reforming catalysts A to C according to the examples of the present invention, the Ni component is brought into a state of being fully dissolved and dispersed in the whole of the solid solution when the solid solution is formed. Therefore, it is possible to obtain metal Ni and/or NiO grains having a small grain size of 50 nm or less when the Ni phase and/or the NiO phase is deposited. It is believed that by the effect of this miniaturization of Ni and/or NiO, the function of restraining carbon deposition is enhanced.

On the other hand, an excessive amount of NiO exceeding the solid solution limit is added in comparative example reforming catalyst D, so that Ni and/or NiO grains having a large grain size equivalent to that of the source material NiO remain in the manufactured catalyst D. As a result, it is believed that carbon deposition is liable to be generated under a high-pressure condition.

Based on the results with reforming catalysts A, B, C, and D, the amount of the dissolved Ni component is preferably within a range of 2.2 parts by mol to 13.5 parts by mol relative to 100 parts by mol of $Sr_2TiO_4$.

Although reforming catalyst E has the same composition as reforming catalyst A in terms of the composition of the source materials, reforming catalyst E was fired at a temperature of 800° C. in the manufacturing step, so that the NiO—$Sr_2TiO_4$ solid solution is not formed. For this reason, Ni and/or NiO grains having a large grain size equivalent to that of the source material NiO remain and, as a result, it is believed that carbon deposition is liable to be generated under a high-pressure condition.

In reforming catalysts F and G, a NiO—$Ba_2TiO_4$ solid solution or a NiO—$Sr_2ZrO_4$ solid solution is not formed during the manufacturing process, so that Ni and/or NiO having a large grain size remains in the catalysts, and it is supposed that carbon deposition is liable to be generated.

In the above-described examples, a NiO—Sr$_2$TiO$_4$ solid solution was formed by thermally treating a mixture of NiO, SrCO$_3$, and TiO$_2$; however, the reforming catalyst of the present invention containing SrTiO$_3$, SrCO$_3$, and Ni and/or NiO can be manufactured by forming a NiO—Sr$_2$TiO$_4$ solid solution by thermally treating a mixture containing Ni and/or NiO, SrCO$_3$, and SrTiO$_3$ at a temperature of 900° C. or higher.

[3] Reforming Test Using Carbon Dioxide and/or Water Vapor and Evaluation of Properties As shown in FIG. 1, a reaction tube 1 made of metal and equipped with a heater 2 in the outside was loaded with 5 cc of the reforming catalyst A manufactured in the above-described manner, and a mixed gas of nitrogen and 20 vol % carbon dioxide was allowed to flow through an inlet 4 of the reaction tube 1. The mixed gas inlet temperature was controlled to be 900° C. by the heater 2.

Thereafter, the various source material mixed gases shown in Table 2 were allowed to flow at a flow rate of 10NL/h for 8 hours, so as to start and carry out a reforming test of 8 hours.

During the reforming test, the pressure within the reaction tube 1 was adjusted to 5 atm in terms of absolute pressure by adjusting a back-pressure valve 6 disposed on an outlet 5 side of the reaction tube 1.

Also, the gas obtained through the outlet 5 during the test was introduced into an analyzing apparatus to measure gas concentration.

After the test was finished, the gas flow was stopped to allow cooling, and the reforming catalyst 3 was taken out from the reaction tube 1 to perform thermal weight measurement under CO$_2$ flow. In the thermal weight measurement, the carbon deposited on the sample and CO$_2$ were allowed to react as in:

$$C + CO_2 \Rightarrow 2CO \quad (2)$$

so as to estimate the decrease in the sample weight as a carbon deposition amount. Table 2 shows source material gas composition, reaction conversion ratio of methane to carbon monoxide, and carbon deposition amount.

Test number 1 of Table 2 represents reforming with carbon dioxide in which the hydrocarbon methane and carbon dioxide are allowed to react with each other; test numbers 2 and 3 represent combination reforming with use of both of carbon dioxide and water vapor; and test number 4 represents reforming with water vapor in which the methane and water vapor are allowed to react with each other.

TABLE 2

| Test number | Source material gas composition (CH$_4$:CO$_2$:H$_2$O) | Methane conversion ratio [%] | Deposited carbon [wt %] |
|---|---|---|---|
| 1 | 1:1:0 (reforming with carbon dioxide) | 86 | 0 |
| 2 | 1:0.5:0.5 (combination reforming) | 85 | 0 |
| 3 | 1:0.25:0.75 (combination reforming) | 85 | 0 |
| 4 | 1:0:1 (reforming with water vapor) | 85 | 0 |

As is shown in Table 2, the reforming reaction proceeds sufficiently when the catalyst A is used under any of the source material gas conditions (namely, in any of the reforming reactions of reforming with carbon dioxide, combination reforming, and reforming with water vapor), and catalyst A was confirmed to exhibit a methane conversion ratio close to the equilibrium gas composition at 900° C./5 atm.

Also, it was confirmed that carbon deposition is not generated even by combination reforming in which both of carbon dioxide and water vapor are allowed to react with the methane in the test numbers 2 and 3.

Further, it was confirmed that carbon deposition is not generated even when reforming reaction of methane with water vapor at a ratio of CH$_4$/H$_2$O=1.

[4] Comparison of Properties Between the Catalyst A According to the Example of the Present Invention and a Commercially Available Reforming Catalyst.

The inside of a reaction tube 1 of an apparatus shown in FIG. 1 was loaded with 5 cc of the above catalyst A, and a mixed gas of nitrogen and 20 vol % carbon dioxide was allowed to flow at a predetermined rate through an inlet 4 of the reaction tube 1. The mixed gas inlet temperature was controlled to be 900° C. by a heater 2.

Thereafter, various source material mixed gases shown in test number 11 or 13 of Table 3 were allowed to flow at a flow rate of 10 NL/h, so as to carry out a reforming test of 100 hours. During the reforming test, a back-pressure valve was opened to attain a 1 atm reaction pressure.

For comparison, the inside of a reaction tube 1 of an apparatus shown in FIG. 1 was loaded with 5 cc of a commercially available reforming catalyst H containing NiO and alumina as major components, and a nitrogen gas was allowed to flow through an inlet 4 of the reaction tube 1. The mixed gas inlet temperature was controlled to be 900° C. by heater 2.

Thereafter, the various source material mixed gases shown in test number 12 or 14 of Table 3 were allowed to flow at a flow rate of 10 NL/h, so as to carry out a reforming test of 100 hours. Here also, a back-pressure valve was opened to attain a 1 atm pressure during the reforming test.

Table 3 shows source material gas composition, reaction conversion ratio of methane to carbon monoxide, and carbon deposition amount.

TABLE 3

| Test number | Source material gas composition (CH$_4$:CO$_2$:H$_2$O) | Catalyst | Methane conversion ratio [%] | Deposited carbon [wt %] |
|---|---|---|---|---|
| 11 | 1:1:0 (reforming with carbon dioxide) | A | 96 | 0 |
| 12 | 1:1:0 (reforming with carbon dioxide) | H | 96 | >10 |
| 13 | 1:0:1 (reforming with water vapor) | A | 96 | 0 |
| 14 | 1:0:1 (reforming with water vapor) | H | 96 | 2.1 |

Table 3 shows that in the reforming test number 12 carried out under a condition of CH$_4$: CO$_2$=1:1 by using the commercially available reforming catalyst H. The reaction tube became clogged and the internal pressure rose after several hours from the start of the test, so that the test was stopped. Carbon was mingled in the catalyst collected, and 10 g or more of carbon was collected.

Also in the reforming test number 14 carried out under a condition of CH$_4$: H$_2$O=1:1 by using the commercially available reforming catalyst H, there was no rise in the internal pressure of the reaction tube, and a reforming test of 100 hours could be carried out. The catalyst recovered was fired in an oxygen atmosphere, and the burnt carbon amount was estimated by measuring the concentration of $CO_2$ contained in the outlet gas. Although the carbon deposition amount in the reforming test with water vapor was a smaller amount compared with the reforming with carbon dioxide, a carbon deposition of 2.1 wt % was generated so that it was confirmed that the accumulation of carbon raises a problem under a practical operation conditions exceeding several thousand hours.

In contrast, there was no rise in the internal pressure of the reaction tube with respect to the catalyst A in any of the conditions of $CH_4:CO_2=1:1$ of the test number 11 and the condition of $CH_4:H_2O=1:1$ of the test number 13, so that a reforming test of 100 hours could be carried out. Also, carbon deposition was not confirmed from the thermal weight measurement under $CO_2$ flow.

The above results confirm that the catalyst A is excellent in the capability of restraining and preventing carbon deposition as compared with the commercially available reforming catalyst H. It was confirmed that the effect is not limited to the reforming reaction of methane with carbon dioxide but also a conspicuous effect was achieved even in the reforming reaction of methane with water vapor.

The present invention is not limited to the above-described examples in other respects, so that various applications and modifications can be added within the range of the invention with respect to the conditions in the step of producing a NiO—$Sr_2TiO_4$ solid solution, the condition in the step of producing $SrTiO_3$, $SrCO_3$, and Ni and/or NiO by allowing carbon dioxide to act on the NiO—$Sr_2TiO_4$ solid solution, the specific conditions of the reforming reaction, and the like.

Industrial Applicability

The present invention makes it possible to manufacture a reforming catalyst capable of efficiently manufacturing a synthesized gas containing hydrogen and carbon monoxide from a hydrocarbon source material gas while restraining carbon deposition when the catalyst is used in any of reforming reactions in which reforming is carried out by allowing hydrocarbon and carbon dioxide to react with each other, hydrocarbon and water vapor are reacted with each other, and combination reforming with the use of both of carbon dioxide and water vapor.

Therefore, the present invention can be widely applied to the field of reforming catalysts and the field of art related to the manufacture of a synthesized gas containing hydrogen and carbon monoxide.

Description of Reference Symbols

| | |
|---|---|
| 1 | reaction tube |
| 2 | heater |
| 3 | reforming catalyst |
| 4 | inlet of reaction tube |
| 5 | outlet of reaction tube |
| 6 | back-pressure valve |

The invention claimed is:

1. A hydrocarbon gas reforming catalyst comprising a NiO-$Sr_2TiO_4$ solid solution in which NiO is dissolved in $Sr_2TiO_4$.

2. The hydrocarbon gas reforming catalyst according to claim 1, wherein the amount of NiO in the NiO-$Sr_2TiO_4$ solid solution is 2.2 to 13.5 parts by mol relative to 100 parts by mol of $Sr_2TiO_4$.

3. The hydrocarbon gas reforming catalyst according to claim 2, further comprising $SrCO_3$, and fine grains of at least one of Ni and NiO.

4. The hydrocarbon gas reforming catalyst according to claim 1, further comprising $SrCO_3$, and fine grains of at least one of Ni and NiO.

5. A hydrocarbon gas reforming catalyst comprising a NiO-$Sr_2TiO_4$ solid solution in which NiO is dissolved in $Sr_2TiO_4$, made by the method comprising
thermally treating a mixture containing at least one of $SrTiO_3$ and $TiO_2$, $SrCO_3$, and at least one of Ni and NiO at a temperature of 900° C. or higher.

6. The hydrocarbon gas reforming catalyst according to claim 5, wherein the method further comprising contacting carbon dioxide with the NiO-$Sr_2TiO_4$ solid solution.

* * * * *